3,390,123
MOLDING COMPOSITIONS
James D. Frichette, Seattle, Wash., assignor, by mesne assignments, to Weyerhaeuser Company, Tacoma, Wash., a corporation of Washington
No Drawing. Filed Mar. 9, 1962, Ser. No. 178,571
3 Claims. (Cl. 260—47)

The present invention relates to compositions useful in molding and especially to compacted mixtures of reactive components held together in stable admixture and which possess the capacity of curing when subjected to heat and pressure and which are further characterized by enhanced capacity to flow at low pressure. The present invention is particularly directed to molding compositions in which an epoxy resin is stably combined with a curing agent for epoxy resins, especially an aminaceous curing agent, while providing an easily curable molding material which flows well when subjected to molding conditions of elevated temperature and pressure.

It is known to form molding compositions by merely physically mixing together epoxy resin, amine or other curing agent therefor and various conventional adjuncts to form a powdered mixture. However, the powdered mixture tends to separate or stratify rendering the composition of only limited utility. Moreover, these mere physical mixtures cannot be effectively compression molded because of the difficulty of removing entrapped air therefrom.

It is also known to form molding compositions by more intimately associating the same components. However, these components are highly reactive with one another when intimately associated as in a liquid medium or milled paste so that mixtures thereof which are not at least partly reacted are not stable at room temperature. On the other hand, by partially reacting the components and then stopping the reaction or by permitting the mixture to advance to an intermediate extent, one can form stable mixtures, but these partially reacted mixtures are more highly advanced in their degree of polymerization which reduces flow at any given condition of temperature and pressure so that the molding composition is less desirable, especially in the molding of large or complex pieces.

It is further known to compact mixtures of powdered materials to provide a non-segregating mixture, but such compaction involves high pressures which create elevated temperatures. Since the mixture of epoxy resin and epoxy curing agent, especially polyamines and polycarboxylic acid anhydrides, which are used in the invention cure rapidly under molding conditions of elevated temperature and pressure, one would expect that the high pressure and elevated temperatures involved in compacting would cause the highly coreactive components involved in the invention to detrimentally react with one another. The invention is based on the unexpected finding that when large pressures are very rapidly applied and released, that non-segregating compacted masses of coreactive powdered materials can be formed without perceptible or significant coreaction.

In the present invention, a powdered epoxy resin, a powdered epoxy curing agent (preferably an amine curing agent) and preferably also a powdered accelerator and other powdered agents such as release agents, fillers and coloring agents are thoroughly mixed together dry and then compacted under great pressure into coarse chunks up to about ¼ inch thick, the pressure being rapidly released to avoid premature reaction. The coarse chunks may have a thickness somewhat greater than ¼ inch, especially when refrigeration is used to minimize premature reaction. The compacted masses so-produced form a molding material of great density, the individual components of the masses being substantially unreacted and held in position within the mass so that there is no separation or stratification of the components. Normally, the powdered mixture which is compacted has a specific gravity of about 0.5 or less, and is compacted into a mass having a specific gravity in the range of from 1.5 to 1.7. The molding material so-formed is uniquely characterized by long storage life and by an enhanced capacity to flow under given conditions of elevated temperature and pressure, especially at lower pressures than are usually required for molding epoxy molding compositions containing the same chemical components.

The present invention may use, as the epoxy resin component, any polyepoxide which is a solid under normal atmospheric conditions, such solidity being referred to hereinafter as "normally solid." Preferably, the polyepoxide which is selected will have an epoxy equivalency of at least 2.0, the epoxy group being carried in a terminal or non-terminal position, but preferably in a terminal position by a glycidyl ether group. Since it is desired to employ highly reactive epoxy resins and to produce a molded product having a high heat distortion temperature, it is preferred to employ polyepoxides having an epoxy equivalency of at least 3.0, and which contain a minimum of less reactive groups such as secondary hydroxyl groups. These preferred polyepoxides are adapted to be rapidly and extensively thermoset by coreaction with polyamines, polycarboxylic acids and anhydrides such as dicarboxylic acids and their anhydrides, and the like. Preferably, the epoxy resin consists of atoms of carbon, hydrogen, and oxygen, and the functional groups thereof consist essentially of the epoxy or oxirane group.

Preferred polyepoxides with terminal epoxy groups are illustrated by solvent-soluble polyglycidyl ethers of phenols which contain 3 or more nuclear hydroxyl groups, the hydroxyl groups being converted to glycidyl ether groups by reaction with a large excess of epichlorohydrin in the presence of a strongly alkaline material, especially sodium hydroxide, which operates to dehydrochlorinate the chlorohydrin functionality produced by reaction with the epichlorohydrin reagent. Tetraphenols are especially preferred, these being illustrated by 1,1,2,2-tetrakis(hydroxyphenyl) ethane;
1,1,3,3-tetrakis(hydroxyphenyl) propane;
1,1,4,4-tetrakis(hydroxyphenyl) butane;
1,1,5,5-tetrakis(hydroxyphenyl)-3-methylpentane;
1,1,4,4-tetrakis(hydroxyphenyl)-2-ethylbutane;
1,1,8,8-tetrakis(hydroxyphenyl) octane;
1,1,10,10-tetrakis(hydroxyphenyl) decane;
1,1,3,3-tetrakis(hydroxyphenyl)-2-chloropropane;
1,1,3,3-tetrakis(hydroxyphenyl)-2-nitropropane;
1,1,4,4-tetrakis(hydroxyphenyl)-2,3-dibromobutane;
1,1,6,6-tetrakis(hydroxyphenyl) hexanol-2;
1,1,2,2-tetrakis(2-hydroxy-5-methylphenyl) ethane;
1,1,3,3-tetrakis(4-hydroxy-2,6-ditertiarybutylphenyl) propane;
1,1,6,6-tetrakis(3-chloro-4-hydroxyphenyl) hexane; and
1,1,4,4-tetrakis(2-hydroxynaphthyl) butane.

These tetraphenols may be converted to the corresponding tetraglycidyl ethers as taught, for example, in United States Patent No. 2,806,016.

Other preferred epoxy resins which are useful in the invention and which are solid at room temperature are the epoxidized novolak resins. Suitable novolak resins are illustrated linear thermoplastic phenol-formaldehyde condensates, these being prepared by condensing a phenol such as phenol or cresol with a molar deficiency of formaldehyde, e.g., 0.5–0.8, and preferably 0.6–0.7 mole of formaldehyde per mole of phenol. These condensates contain many phenolic hydroxyl groups per molecule and may be epoxidized by reaction with excess epichlorohydrin and simultaneous dehydrochlorination with sodium hydroxide. The result is a polyglycidyl ether of the linear condensate known as an epoxidized novolak. The epoxidized novolak materials are normally solid and have an epoxy equivalency in excess of 3.0.

Normally solid polyepoxides having non-terminal epoxy groups are illustrated by 3,4-epoxy-6-methylcyclohexylmethylene 3,4 - epoxy - 6 methylcyclohexane carboxylate.

While more conventional normally solid epoxy resins such as polyglycidyl ethers of bisphenol A having sufficient molecular weight to be normally solid may be used, these are less preferred.

The epoxy resins in the invention are cured by coreaction with a normally solid epoxy curing agent which is preferably a polyamine or a polycarboxylic acid anhydride. As is well known, epoxy curing agents broadly designate compounds having a plurality of groups which are reactive with the

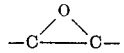

group.

The term "polyamine" designates an organic compound containing at least two amine groups, each supplying at least one active hydrogen atom. While the proportion of polyamine may broadly vary from ½% to 30% by weight of the epoxy resin, it is preferred to employ stoichiometric proportions as indicated by the following formula:

$$\frac{\text{Molecular wt. of polyamine}}{\text{Total number of active hydrogen atoms supplied by the polyamine}} \times$$

Epoxy value = Number of parts of polyamine to be used per 100 parts of epoxy resin The term "epoxy value" is a common term designating the number of oxirane equivalents per 100 grams of epoxy resin.

Preferably, the polyamine is a diamine in which each amine group is a primary amine group. Polyamines in which the amine groups are carried by an aromatic nucleus are particularly preferred. Thus, preferred polyamines are represented by methylene dianiline, m-phenylene diamine, and m-tolylene diamine. While primary diamines carried by an unsubstituted aromatic nucleus are preferred for use as curing agent in the invention, substituted carrier nucleus for the diamine can also be utilized.

While polyamine curing agents are preferred, solid polycarboxylic acids, especially in anhydride form, may also be used such as succinic anhydride, sebacic anhydride, chlorendic anhydride, and the like. When anhyrides are used, they are desirably employed in equivalent proportions of from 0.4–1.0 anhydride group per epoxy group.

The molding compositions of the invention desirably include substantial proportions of fillers, especially mineral fillers which are at least slightly alkaline. Preferably, at least 20% and desirably at least 40% by weight of the molding composition is constituted by at least slightly alkaline mineral filler. In the prior art, the presence of large proportions of filler during milling of the composition generated heat which lead to an advance in resinification. Moreover, the alkaline mineral filler tended to degrade the stability of the final molding composition. The achievement of high mineral loadings without significant resin advance and the provision of stable molding compositions in the presence of large amounts of mineral filler are features of the present invention. Speaking generally, up to about 70–80% by weight of the molding composition may be filler and/or pigment in accordance with the invention, a value difficult to achieve in practice in many instances using the prior practice of milling the components of the molding composition with one another.

Preferred fillers are calcium carbonate and barium sulfate, ground asbestos and ground glass, titanium dioxide, zirconium dioxide and powdered alumina, mica, clay and talc. Harder fillers such as flint powder and quartz are usable but are generally unduly hard for most mold surfaces and tend to score the same. Thus, silica flour may be used despite its abrasive tendencies. Optimum electrical properties are frequently obtained using combinations of fillers, e.g., finely divided clay or calcium carbonate in admixture with barium sulfate.

Various other adjuncts may also be present such as release agents and accelerators.

As is conventional in molding compositions, release agents are desirably present in small amount to prevent the molded product from adhering to the mold. The specific release agent selected is not of consequence to the invention, 0.5–4.0% by weight of calcium stearate illustrating a typical useful release agent in satisfactory quantity.

Accelerators may also be present to speed the cure. Even liquid accelerators in small amount can be used in the dry mixture, these being absorbed by the dry components of the mixture without changing the dry characteristic thereof. Suitable accelerators are illustrated by phenol, rescorcinol, catechol and cresol; tertiary amines, alcohols, dibasic acids, etc. As will be evident, the presence of and the selection of the accelerator is of secondary significance.

The various components of the molding composition are desirably ground separately to small particle size and then the various powders are physically mixed in the absence of pressure. Suitable mixing equipment is illustrated by a ribbon blender or a twin shell blender. The purpose is to merely tumble the powders until they are thoroughly and uniformly mixed together while avoiding the kneading and similar forces associated with milling which generate heat and which are detrimental as been explained. Stated simply, the powders are mixed together in the substantial absence of kneading forces to provide a loose uniform particulate mixture of substantially unreacted particulate components.

When the powders being mixed are initially of small particle size, mixing and minor grinding many be combined in a hammer mill operated at high speed which combines intensive mixing with minor grinding without significantly heating the mixture. Preferably, a large amount of air, desirably cooled air, is passed through the hammer mill to keep the particles being mixed relatively cool and hence unreacted.

This loose uniform particulate mixture is then compacted to form a non-segregating mass.

It is essential to the invention that the pressure be applied and then quickly released so that the heat and pressure of the compacting operation does not cause the admixed materials to coreact.

Various conventional compactors are adapted to apply pressure and then quickly release the pressure, opposed compacting rollers being particularly adapted for such purpose. Thus, the loose uniform particulate mixture may be compacted using an Allis-Chalmers compactor having a roll clearance of from about 0.005 to 0.020 inch using a hydraulic pressure of 10,000 p.s.i. This compacting device consists essentially of two closely spaced parallel steel rollers between which the powder is passed and is well adapted to apply high pressure under conditions in which pressure application is only momentary, e.g., is quickly released. In preferred apparatus, the rollers back off automatically when the applied pressure becomes excessive. Moreover, the rollers should have sufficient mass for rapid heat dissipation or coolants should be used to prevent temperature buildup at the roller surface. The capacity of the rollers to dissipate heat is of importance and it effectively limits the thickness of the compacted mass to about ¼ inch. In this way, undesirable resin advance is avoided despite the reactivity of the components which are compacted and the intimate association into which they are forced.

Compacting rollers, as described, produce a ribbon of material. To minimize resin advance, the ribbon should be thin so that any heat which is generated may be rapidly dissipated. A preferred upper limit for ribbon thickness is ⅛ inch.

The compacted ribbon is then communited, preferably to a size which will pass through a 10 mesh screen and be retained by a 40 mesh screen. Masses which are too small or too large may be recycled.

The communited particles so-produced constitute the composition which is molded.

The invention is illustrated in the following examples:

Example I

A molding composition having the following composition was produced in the manner described below:

| | Percent |
|---|---|
| Epoxidized novolak (Note 1) | 34.0 |
| Methylene dianiline | 7.6 |
| Resorcinol | 3.4 |
| Clay filler | 17.6 |
| Barytes (BaSO$_4$—Pigment) | 35.4 |
| Calcium stearate release agent | 2.0 |
| | 100.0 |

See Note 1 at end of specification.

All of the solid components specified above are supplied in fine particulate size as is produced by grinding using a standard hammer mill, until the finely ground product passes through a screen having openings 0.016 inch in size.

After grinding, each of the individually ground components is mixed together with the resorcinol accelerator in a ribbon blender until the product is a uniformly dispersed free-flowing powdered mixture. The mixture is then compacted using two closely spaced, parallel steel rollers having a roll clearance of 0.010 inch, the rollers supplying an initial bearing pressure of 5,000 p.s.i. and having an operating varying pressure of 15,000 p.s.i. A roller speed of 10-30 revolutions per minute is employed. The powdered mixture is passed through the compacting rollers twice to form a compacted product having the form of a thin ribbon. The ribbon is then granulated using a conventional chopper mill and screened to select those which pass through a 10 mesh screen and which are retained by a 40 mesh screen. While two passes through the compacting rollers was used in the present example, the invention is not limited in this respect and one or more compactions are used to provide the desired densification.

The finished powder mixture is in the form of coarse irregular chunks. This product can be sacked in polyethylene bags and stored indefinitely at 40° F.

The product of the present example is subjected to elevated temperature and pressure for 5 minutes to mold the same. The molded product exhibits the following typical characteristics:

(1) Flexural strength _____ 8,443 p.s.i.
(2) Rockwell hardness _____ 110 M scale.
(3) Izod impact strength _____ 0.35 ft.-lbs./in. notch.
(4) Heat distortion temperature _____ 282° F. at 264 p.s.i.
(5) Mold shrinkage _____ 0.060 in./in.
(6) Coefficient of linear thermal expansion _____ 30–60° C.—4.75×10$^{-5}$, 60–90° C.—5.80×10$^{-5}$.
(7) Weight loss 200° C. for 100 hours _____ 5.26%.
(8) Water absorption 25° C. for 24 hours _____ 0.096%.
(9) Bulk factor of molding composition _____ 2.07.
(10) Molded density _____ 1.74.
(11) Volume resistivity 73° F. at 50% humidity _____ 1.26×10$^{16}$ ohm-centimeters.
(12) Surface resistivity 73° F. at 50% humidity ____ 6.14×10$^{14}$ ohms.
(13) Dielectric constant (60 cycles) _____ 4.43.
(14) Loss factor (60 cycles) _____ 0.1329.
(15) Power factor (60 cycles) _____ 0.030.
(16) Arc resistance (seconds) _____ 120.
(17) Storage life of molding composition _____ Indefinite time at 40° F. and also at 73° F. (At 40° F. and at 73° F., there is no significant loss in flow upon storage for 6 months.)

Example II

Example I is repeated to produce a molding composition having the following composition:

| | Percent |
|---|---|
| Epoxidized Novolak (Note 1) | 34.0 |
| Succinic anhydride | 15.0 |
| P,P' methylenebis-(N,N-dimethylaniline) | 2.0 |
| Silica flour | 47.0 |
| Calcium stearate | 2.0 |
| | 100.0 |

See Note 1 at end of specification.

The product possesses essentially the same properties reported for Example 1, with the exception that the heat distortion temperature of the product is 130° C. at 264 p.s.i.

Example III

Example I is repeated again to form a molding composition having the following composition:

| | Percent |
|---|---|
| Tetra glycidyl ether of 1,1,2,2-tetrakis (hydroxy phenyl) ethane | 34.24 |
| Methylene dianiline | 7.76 |
| Resorcinol | 2.00 |
| Silica flour | 54.00 |
| Calcium stearate | 2.00 |
| | 100.00 |

Once again, the properties of the molding composition produced are essentially the same as those reported for the molding composition of Example I, with the exception that the heat distortion temperature of the product is 260° C. at 264 p.s.i.

The epoxidized novolak resin used has an epoxide functionality of 4.8, an epoxide equivalent weight of 225 and a softening point (Durrans) of 73° C.

NOTE 1

The epoxidized novolak resin utilized in Examples I and II is an epoxidized linear condensate of o-cresol with formaldehyde produced by condensing 0.65 mol of formaldehyde with 1 mol of cresol, to form a linear condensate which contains many phenolic hydroxyl groups. These phenolic hydroxyl groups are epoxidized by reaction with a large molar excess of epichlorohydrin in the presence of sodium hydroxide to obtain a compound of the following structure:

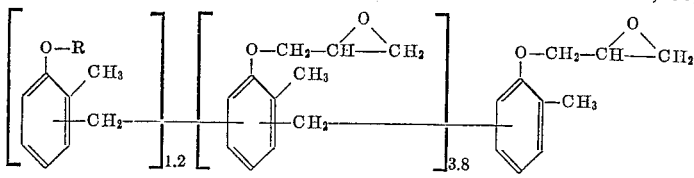

in which R represents chlorohydrin, glycols and polymeric ethers.

What is claimed is:

1. A method of producing a stable and non-segregating epoxy resin molding composition convertible under application of heat and pressure to a thermoset condition and containing an epoxy resin having an epoxy equivalency of at least 3 and a curing agent coreactive with said resin in intimate association with and substantially unreacted with one another comprising, mixing in the absence of liquid carriers finely divided normally solid epoxy resin and finely divided normally solid curing agent coreactive with said resin in the substantial absence of kneading forces and subjecting said mixture to momentary pressure to densely compact said mixture.

2. The method recited in claim 1 in which said curing agent is a polyamine.

3. The method recited in claim 1 in which said mixture is subjected to roller pressure to form a compressed sheet and subdividing said sheet into discrete masses.

References Cited

UNITED STATES PATENTS

| | | | |
|---|---|---|---|
| 2,965,930 | 12/1960 | Paul | 260—37 |
| 2,989,498 | 6/1961 | MacKenzie et al. | 260—37 |
| 2,773,048 | 12/1956 | Formo et al. | 260—47 |
| 3,159,595 | 12/1964 | Parry | 260—47 |
| 2,866,768 | 12/1958 | Bolstad | 260—47 |
| 2,899,407 | 8/1959 | Cyba | 260—47 |
| 2,921,923 | 1/1960 | Bruin et al. | 260—47 |
| 2,934,520 | 4/1960 | Mayurnik | 260—47 |
| 2,958,609 | 11/1960 | Stoll et al. | 260—37 |
| 3,025,263 | 3/1962 | Lee | 260—47 |
| 2,806,016 | 9/1957 | Schwarzer | 260—47 |

FOREIGN PATENTS 629,111  9/1949  Great Britain.

OTHER REFERENCES

H. Lee and K. Neville, "Epoxy Resin," McGraw-Hill Book Co., N.Y., 1957, pp. 18 and 20 relied upon.

C. Winding and G. Hiatt, "Polymeric Materials," McGraw-Hill Book Co., N.Y., 1961, pp. 114–118 relied upon.

MORRIS LIEBMAN, *Primary Examiner.*

J. E. CALLAGHAN, T. D. KERWIN,
*Assistant Examiners.*